(12) United States Patent
Mawson et al.

(10) Patent No.: US 6,489,408 B2
(45) Date of Patent: Dec. 3, 2002

(54) POLYMERIZATION PROCESS

(75) Inventors: Simon Mawson, Charleston, WV (US); John Francis Szul, Nitro, WV (US); Mark Gregory Goode, Hurricane, WV (US); Clark C. Williams, Charleston, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 09/727,237

(22) Filed: Nov. 30, 2000

(65) Prior Publication Data

US 2002/0065374 A1 May 30, 2002

(51) Int. Cl.⁷ .............................................. C08G 85/00

(52) U.S. Cl. ........................................ 526/68; 526/901

(58) Field of Search ................................... 526/68, 901

(56) References Cited

U.S. PATENT DOCUMENTS 5,541,270 A * 7/1996 Chinh et al. ................... 526/68
5,693,727 A   12/1997 Goode et al. .................. 526/86
5,948,871 A    9/1999 Goode et al. .................. 526/86

* cited by examiner

*Primary Examiner*—David W. Wu
*Assistant Examiner*—William K Cheung
(74) *Attorney, Agent, or Firm*—Univation Technologies

(57) ABSTRACT

The present invention relates to a method to polymerize monomer comprising contacting one or more monomer(s) with a catalyst system in a gas phase reactor having a recycle system, for removing a recycle gas and unreacted monomer(s) from the reactor and returning the recycle gas and fresh monomer(s) to the reactor, and a plenum, the method comprising the steps of: (a) cooling the recycle gas to form a cooled recycle gas; (b) optionally combining the cooled recycle gas with additional recycle gas; and (c) injecting the cooled recycle gas into the gas phase reactor through the plenum.

18 Claims, 1 Drawing Sheet

POLYMERIZATION PROCESS

FIELD OF THE INVENTION

The present invention relates to a method to improve a gas phase reactor polymerization process by injecting a cooled recycle gas directly into the plenum of a gas phase reactor, preferably during high levels of a condensing mode gas phase process.

BACKGROUND OF THE INVENTION

Advances in polymerization and catalysis have resulted in the capability to produce many new polymers having improved physical and chemical properties useful in a wide variety of superior products and applications. With the development of new catalysts, the choice of polymerization conditions (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene catalyst systems in slurry or gas phase. There is a desire in the industry using this technology to reduce the complexity of the process, to improve the process operability, to increase product characteristics and to vary catalyst choices. Thus, it would be advantageous to have a process that is capable of improving one or more of these industry needs.

In particular there exists a need in the industry to improve gas phase reactor operations and operation costs and/or resin particle formation in gas phase systems that can polymerize olefins using a solution fed catalyst system.

The temperature of the plenum gas flow in a gas or slurry phase system affects the performance of the catalyst. If the temperature is too low, such as for example near or below the dew point of the cycle gas, the catalyst system injected into the region of the fluidized bed at the plenum takes longer to dry and in the presence of rapid polymerization systems may lead to the formation of small resin particle agglomerates of deficient size and morphology for optimal fluid bed operation. If the temperature of the plenum gas flow is too high, the spray or slurry containing the catalyst system may dry out too rapidly resulting in extremely fine resin particles or particles fusing together due to high temperatures and poor cooling during the initial stages of polymerization. Catalyst productivity may also be reduced by excessive initial temperatures of the plenum gas flow. It is desirable to control temperature of the plenum gas flow (particle deflecting gas) within a range that, depending upon the particular catalyst and process conditions, results in high catalyst activity and a resin morphology conducive to good mixing and operation of the fluid bed reactor.

U.S. Pat. No. 5,693,727 discloses plenum usage in gas phase polymerization where the recycle stream or a portion thereof is cooled and the recycle stream is returned directly to the reactor.

The instant invention provides a method to control plenum gas flow temperature by cooling a portion of the recycle gas and returning it to one reactor via the plenum.

SUMMARY OF THE INVENTION

This invention relates to a method to polymerize olefin(s) comprising contacting one or more monomer(s) with a catalyst system in a gas phase reactor having a recycle system, for removing a recycle gas and unreacted monomer(s) from the reactor and returning the recycle gas and fresh monomer(s) to the reactor, and a plenum, the method comprising the steps of: (a) cooling the recycle gas to form a cooled recycle gas; (b) optionally combining the cooled recycle gas with additional recycle gas; and (c) injecting the cooled recycle gas into the gas phase reactor through the plenum.

DETAILED DESCRIPTION OF THE INVENTION

Figure 1:
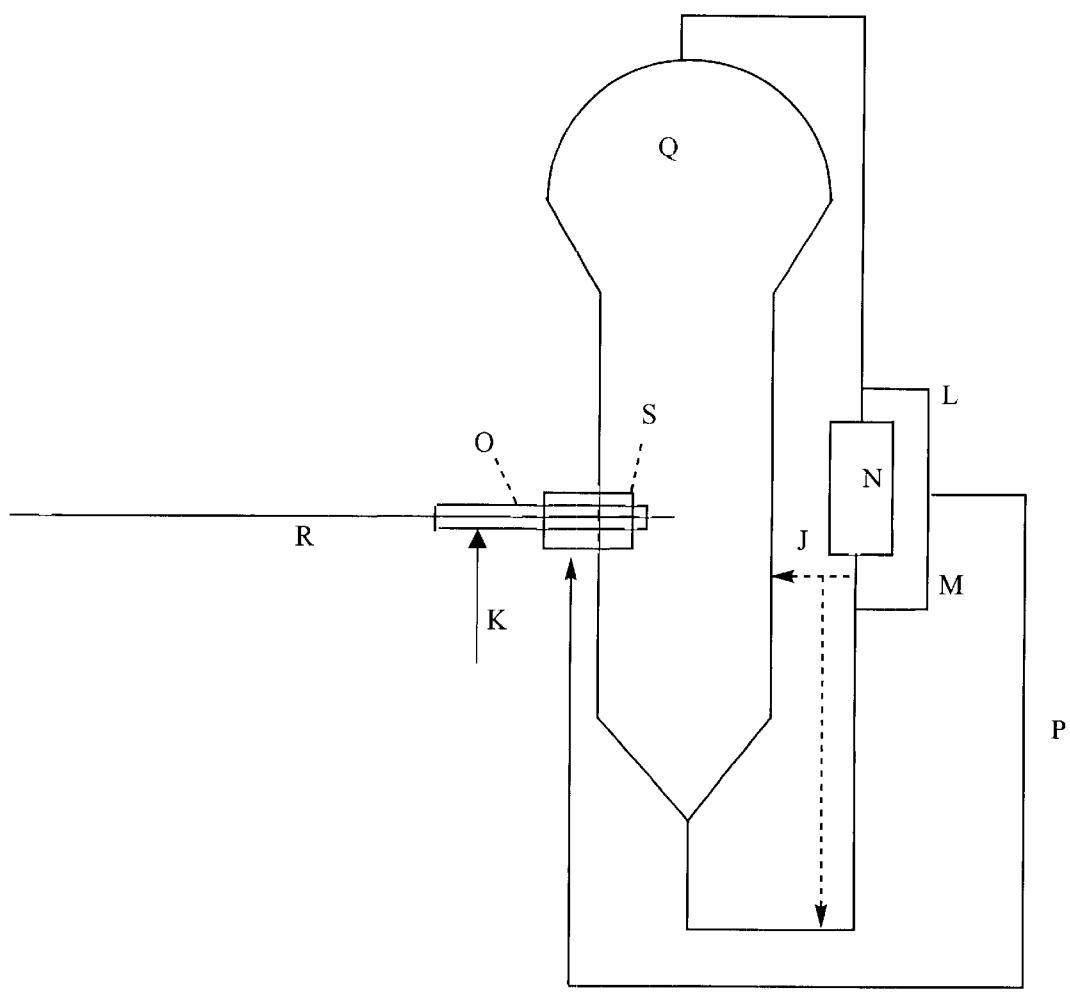
FIG. 1 illustrates a possible equipment configuration to utilize the invention.

Please refer to FIG. 1 for the letters in parenthesis. A plenum is a device used to create a particle lean zone in a fluidized bed gas-phase reactor, as described in detail in U.S. Pat. No. 5,693,727 which is incorporated herein by reference. A plenum, as referred to herein, conveys recycle gas or feed monomer(s), inerts, and chain transfer agents (such as hydrogen) into the polymerization zone. In a preferred embodiment, cycle gas is removed after being compressed and is then directed to the side of the fluidized zone. The plenum can range from 4 to 24 inches (10 to 61 cm), preferably 6 to 12 inches (15 to 31 cm). In a preferred embodiment, the plenum comprises an injection tube and a support tube surrounding the injection tube. Generally speaking, a catalyst mixture is typically passed through an injection tube (R)(such as a ⅛ inch (0.3 cm) tube) into a gas phase reactor (Q). The injection tube (R) may be supported inside a larger support tube (O), such as a 1 inch (2.54 cm) tube. In a preferred embodiment, part of the recycle gas (M), preferably up to 50 weight % (based upon the total weight of the recycle gas), more preferably up to 40 weight %, more preferably up to 30 weight % is cooled, preferably in a heat exchanger (N), to within 20° C. above the dew point of the recycle gas, more preferably within 10° C. above the dew point, more preferably within 5° C. above the dew point of the re-cycle gas. The cooled recycle gas (M) is then optionally combined with additional recycle gas that may or may not have been heated or cooled (L), and is then passed into the reactor through the plenum (S). In some embodiments additional monomer, alkanes, recycle gas, etc may also be passed into the reactor through the injection tube (R) and or the support tube (O). In another embodiment an optional liquid separation device (J) and return lines may also be used in combination with the invention.

The temperature of the recycle gas entering the reactor is preferably as low as possible to provide the maximum heat removal from the fluidized polymerization zone above the distributor. The inlet gas temperature is usually governed by the cooling water temperature. Preferred range for the inlet gas temperature is 25 to 75° C., most preferably 25 to 40° C.

The catalyst injection tube passes into the reactor through a compressed chevron packing and extends into the fluid bed a distance of about 0.1 inch to 10 feet (0.25 cm to 3.1 m), preferably about 1 inch to 6 ft (2.5 cm to 1.8 m), and more preferably about 2 inches to 5 feet (5 cm to 1.5 m). Typically, the depth of insertion depends on the diameter of the reactor and typically extends in about 1/20th to ¼ of the reactor diameter, preferably about 1/10th to ½ and more preferably about ⅕th to ⅓rd of the reactor diameter. The end of the tube may be cut perpendicular to the axis to create a nozzle cone or point with an angle ranging from 0 to 90 degrees, preferably ranging from about 10 to 80 degrees. The lip of the hole can be taken to a new knife-edge. The tube can be positioned to reduce resin adhesion or coated with an antifouling or antistatic compound. The tube can also be cut diagonally at an angle simply from about 0 to 80 degrees off the axial line of the tube, preferably about 0 to 60 degrees. The opening of the tube can be the same as the bore of the tube or expanded or diminished to create a nozzle, with sufficient pressure drop and geometry to provide a dispersed spray of a solution slurry and or powder into the reactor, preferably into the fluid bed.

The injection tube can optionally be supported inside a structure within the fluid bed to provide structural integrity. This support tube is typically a heavy walled pipe with an internal diameter of from about ¼ inch to about 5 inches (0.64 cm to 12.7 cm), preferably about ½ inch to about 3 inches (1.3 cm to 7.6 cm), and more preferably about ¾ inch to about 2 inches (1.9 cm to 5 cm). The support tube preferably extends through the reactor wall to approximately the length of the injection tube, allowing the injection tube to end just inside the end of the support tube or to extend past it up to about 10 inches (25.4 cm). Preferably, the injection tube extends about 0.5 to 5 inches (1.8 cm to 12.7 cm) beyond the end of the support tube and more preferably about 1 to 3 inches (2.5 cm to 7.6 cm). The end of the support tube in the reactor may be cut flat and perpendicular to the axis of the tube or preferably, may be tapered at an angle ranging from about 10 to 80 degrees. The end of the support tube may be polished or coated with an anti-static or anti-fouling material.

A purge flow of fluid (K) (typically fresh monomer, ethylene, hexane isopentane, recycle gas, or the like) is preferably introduced from outside the reactor down the support tube to aid in dispersion of the solution slurry or powder comprising a catalyst system (typically at least one catalyst compound combined with at least one activator) allowing the production of resin granular particles of good morphology with decreased agglomeration and an APS (average particle size) in the range of about 0.005 to 0.10 inches (0.01 cm to 0.3 cm). The purge flow of fluid helps minimize fouling of the end of the catalyst injection tube and support tubes. The fluid introduced to the support tube may comprise hydrogen; olefins or diolefins, including but not limited to $C_2$ to $C_{40}$ alpha olefins and $C_2$ to $C_{40}$ diolefins, ethylene, propylene, butene, hexene, octene, norbornene, pentene, hexadiene, pentadiene, isobutylene, octadiene, cyclopentadiene, comonomer being used in the polymerization reaction, hydrogen; alkanes, such $C_1$ to $C_{40}$ alkanes, including but not limited to isopetane, hexane, ethane, propane, butane, and the like; mineral oil, cycle gas with or without condensed liquids; or any combination thereof. Preferably the support tube flow is fresh ethylene or propylene that may be heated or cycle gas that may be taken before or after passing through a heat exchanger. In addition, an alkane, such as for instance isopentane or hexane, can be included in the flow at the level ranging from about 0.001 wt %. to about 50% of the flow. The alkane can be dispersed in the flow and may exist as dispersed liquid droplets or be vaporized at the exit of the support tube. The presence of liquid may reduce fouling at the exit.

The flow rate of fluid in the support tube ranges from about 5 to 10,000 pounds per hour (2.3–4536 kg/hr) and is somewhat dependent upon the reactor size. The linear velocity of the fluid in the support tube ranges from about 10 to 500 ft/sec (11 to 549 km/hr), preferably about 20 to 300 ft/sec (22 to 329 km/hr) and more preferably about 30 to 200 ft/sec (33 to 219 km/hr).

Alternatively, the exit of the support tube may be fashioned as an orifice or nozzle at the end to form a jet or dispersion of gas to aid in the distribution of the solution, slurry or powder comprising catalyst compound. In one embodiment, the internal diameter of the support tube is reduced gradually by about 3 to 80% at the end, preferably about 5 to 50% in a taper to create a nozzle to accelerate to and or disperse the fluid flow. The insertion of the injection tube is not impacted by the internal taper of the support tube.

In some embodiments, the injection tube may aerosolize the catalyst system mixture. In a preferred embodiment the injection tube has a diameter of about 1⁄16 th inch to about ½ inch (0.16 cm to 1.27 cm), preferably about 3⁄16 ths inch to about ⅜ ths inch (0.5 cm to 0.9 cm), more preferably ¼ inch to about ⅜ths inch (0.6 cm to 0.9 cm).

In one embodiment monomer, preferably a gas such as ethylene gas, is introduced into the support tube with or without cycle gas. In a preferred embodiment, the monomer is injected into the support tube when the dew point of the recycle gas is within 20° C. of the gas inlet temperature.

In a preferred embodiment of the invention, the carrier comprising the catalyst system is surrounded by at least one gas, typically present in the plenum, which serves to move or deflect resin particles of the bed out of the path of the catalyst as it enters the reactor (this gas is referred to as particle deflecting gas) to create a particle lean zone. In another preferred embodiment the catalyst is surrounded by at least two gasses, the first gas (preferably flowing through the plenum) serving to deflect resin particles of the bed out of the path of the catalyst and the second gas (preferably flowing through the support tube) primarily prevents the injection tube or nozzle tip from getting clogged (this gas is referred to as tip cleaning gas).

The particle-deflecting gas flow to the plenum typically comprises cycle gas taken off downstream of the cycle gas blower. The gas can be taken off either before or after the cycle gas heat exchanger, or as a mixture of both using flow control valves to obtain the desired combination to effect the temperature of the mixture. The mixed fluids can be optionally heated or cooled using a secondary heat exchanger prior to introduction to the plenum.

The temperature of the cycle gas before the recirculation loop heat exchanger is typically in the range from 40° C. to 150° C., more preferably about 50° C. to 120° C., and typically is free from liquid although liquid condensate may be present. The temperature of the cycle gas after the recirculation loop heat exchanger may range from about 0° C. to 120° C., more typically about 30° C. to 110° C. The cycle gas after the cooler may or may not contain condensed monomer(s) and/or condensed inert alkanes. When condensation is present it may range from about zero to about 50 weight % of the circulating cycle gas. The plenum gas flow taken after the recirculation loop heat exchanger may likewise be free of condensate or contain from about 0 to 50 weight % of condensate. It may be diluted with gas from before the recirculation loop to reduce or control the quantity of condensate in the plenum gas flow. Alternately, the cycle gas may be supplemented with all or a portion of the monomer supply to the reactor. Based on the temperature of the mixed streams and their composite temperature, the concentration of condensed liquid may be calculated for the plenum gas flow. The mixed flow may be passed through an optional secondary heat exchanger to not only control its temperature, but also to manipulate the quantity of liquid condensed in the plenum gas flow.

The amount of condensed liquid may be increased or reduced. In one embodiment of the invention, the gas leaving the secondary heat exchanger is above its dew point temperature. In another embodiment, gas is withdrawn from before the recirculation line cooler and then cooled in the secondary cooler to a temperature at least 2° C. cooler, preferably at least 5° C. cooler but not below the dew point, preferably by at least 2° C. above the dew point and more preferably at least about 5° C. above the dewpoint. In yet another embodiment, gas is withdrawn from before the recirculation loop cooler and heated by at least 2° C., preferably at least 5° C., in the secondary plenum flow heat exchanger.

In another embodiment, the cycle gas existing the recirculation loop blower passes through a demisting device, cyclone or similarly functioning piece of equipment that removes essentially all or part of the condensed liquid from the cycle gas prior to entering the nozzle for the plenum gas flow. The removed liquid is preferably returned separately to the fluid bed polymerization vessel or to the cycle gas recirculation line. The cycle gas taken after the liquid separation device preferably not only has a reduced liquid content, but also has a lower dew point than the bulk of the cycle gas. This component of the plenum gas may be mixed with warmer gas from before the cycle gas heat exchanger and still maintain a lower dew point than the bulk of the cycle gas. Optionally, the gas may be further cooled or more preferably heated in the secondary (auxiliary) heat exchanger in the plenum flow line. In one embodiment, a higher temperature gas with a dew point lower than the bulk of the cycle gas is passed to the plenum.

As an alternative, a cycle gas cooler and liquid separation device may be located upstream of the blower such that the gas provided to the plenum from downstream of the blower is reduced in dew point. Plenum gas may be taken from above or below the main cycle gas cooler or as a mix of both with possible additional condensation across the cooler. The main cooler may also be replaced and eliminated by the cooler upstream of the compressor requiring only a single point for the plenum line connection. Temperature would then be controlled preferably with the auxiliary heat exchanger.

Preferably, the design of the plenum line is such that fine resin particles entrained in the cycle gas do not settle and accumulate in the lines leading to fouling and loss of flow. Sufficient velocity in maintained to prevent loss of flow and the length of the piping run and the number of bends and angles are minimized and reduced, making use of long radius elbows as appropriate. In a preferred embodiment, the plenum flow piping runs at about the same grade from the take off points at the cycle gas cooler to the plenum. The flow control values are designed to minimize fouling, such as full port ball values. In a preferred embodiment, the temperature flow rate, dew point and composition of the plenum gas is controlled at a level conducive to the formation of polymer resin particles of proper particle size, distribution and morphology for good mixing, fluidization and operation of the polymerization reactor. By composition, this is meant to include the physical composition whether gas or gas plus liquid as well as the chemical composition. Generally speaking, a higher proportion of the heavier hydrocarbon condenses in the cycle gas cooler such that the gas is lean in these components. These components also have lower volatility and are slower to evaporate. Moreover, their presence in the particle-lean zone of the plenum gas flow diminishes the volatility and slows the evaporation of solvent (such as that used in a catalyst solution) possibly leading to a propensity to form larger, more non-uniform particles. The solvent may be the same compound as that primarily condensed in the heat exchanger, such as for example a butane, propane, isopentane or hexane component. Decreasing its concentration in the plenum gas as well as increasing the temperature of the plenum gas further from its dew point may aid in good performance of a solution catalyst feed system. In other situations, increased agglomeration of the catalyst particles may be desired which may be effected by decreasing the temperature of the plenum flow closer to the dew point temperature, increasing the concentration of heavier condensible hydrocarbon in the plenum flow, increasing the concentration of liquid in the plenum gas, or even possibly going to much higher temperature to effect localized agglomeration of the new formed resin particles in the particle lean zone either by sticking among themselves or due to striking existing resin particles.

It is recognized within the scope of this invention that relatively volatile solvents such as propane, butane, isobutane or even isopentane can be matched against a heavier solvent or condensing agent such as isopentane, hexane, hexene, or heptane so that the volatility of the solvent is not so appreciably diminished in the plenum flow particle lean zone. Conversely, heavier solvent, may also be used either to increase resin agglomeration or to control resin particle size.

The temperature, dew point and composition of the cycle gas comprising the plenum flow may be altered by the addition of monomer, comonomer, chain transfer agent and inerts, particularly by the location that they are added. These feedstreams may be added to the polymerization system at a point upstream of the cycle gas cooler system in order to improve operability. (see U.S. Pat. No. 5,034,479 for more information.) In one embodiment of the present invention, ethylene make-up monomer is added to the cycle gas recirculation line at a location upstream of the first take-off point for the plenum gas, either upstream or downstream of the cycle gas blower. Preferably, comonomer, particularly a $C_4$, $C_5$ or $C_6$ alkyl, or heavy inert, such as isopentane, is added to the cycle gas recirculation line at a location after the first take-off point for plenum gas, either before the cooler, after the cooler, before the second take-off point for plenum gas, or more preferably after the second take-off point for plenum gas. It is recognized that it may be desirable in some instances to use plenum gas from the first take-off point. In similar fashion, one can select the location for adding make-up monomers, comonomers, chain-transfer agents, heavy inerts or condensing agents such as propane, butane isopentane or hexane, etc. to the cycle gas recirculation loop relative to the plenum gas take-off points to effect a beneficial manipulation of the plenum gas temperature, composition, and/or dew point. In a preferred embodiment the plenum gas is depleted in heavy hydrocarbons and has a lowered dew point relative to the bulk of the cycle gas. It is further recognized in the scope of this invention that there exist a small gradient of comonomer concentration across the fluidized bed such that the gas existing at the top of the bed contains slightly more or less comonomer than that entering the bottom, and when slightly less also aids in decreasing the dew point of the cycle gas flow. It is also recognized in the practice of this invention that monomer and other feedstreams can be added to any point in the cycle gas recirculation loop or polymerization vessel. For example, the ethylene make-up can be added at a location downstream of the second plenum gas take-off point.

In a preferred embodiment of the invention, monomer, comonomer, inert, chain transfer agent, heavy hydrocarbon and or condensing agent are added directly to the plenum gas line as illustrated in FIG. 1 at (P). Pure monomer may be added at (P). In a preferred embodiment, monomer such as for example ethylene or propylene is added to the plenum gas flow (of diverted cycle gas) to control the plenum gas temperature, composition and/or dew point within or at a desired range, particularly for the purpose of decreasing the quantity of heavy hydrocarbon in the plenum gas and for decreasing the dew point.

The total plenum gas flow may range from about 50 to about 100,000 pounds per hour (22.7–45360 kg/hr) depending upon the size of the polymerization reactor, more preferably from about 500 to 50,000 pph (226.8–22680 kg/hr). The fraction of plenum gas comprising recirculating cycle gas may range from about zero to about 100%, that is, all or part or none of the plenum flow cycle gas may be replaced with feedstream monomer, comonomer, inerts, chain transfer agent, and/or heavy inert. In one embodiment 50% to 99% of the plenum gas is provided by make-up monomer, particularly ethylene or propylene. Monomer typically comes to the polymerization system following a number of purification steps and typically has temperature ranging from about –30° C. to 100° C., more typically about 10° C. to 50° C. The monomer or other component may be passed through an optional heat exchanger to either heat or cool it to a desired temperature prior to mixing with cycle gas in the plenum line or, if no cycle gas is present, prior to passing to the plenum. Its flow may be measured and controlled to provide a desired concentration of fresh feedstream to the plenum. In a preferred embodiment, the dew point of the plenum gas is decreased by at least 2° C., more preferably by about 5° C. by the addition of fresh make-up monomer, such as ethylene, to the plenum.

It is also within the scope of the invention to add heavy hydrocarbon inerts or comonomers to the plenum gas for the purpose of increasing its dew point. This may be done (for example) to affect resin morphology or increase the resin average particle size or reduce resin files, or perhaps to benefit the overall productivity and performance of the catalyst.

Not all the monomer or other component need be added to the plenum, as they may be added as known in the art at other locations to the reactor.

In the practice of the invention, it is possible to manipulate the plenum gas temperature, composition and/or dew point in order to change or control the polymer resin particle size, distribution and/or morphology. It is also possible that the qualities of the plenum gas be set within a desired range that gives adequate performance and other factors related to atomization and spray of the catalyst be used to fine-tune the resin bulk properties.

A resin particle lean zone can be established in the reactor by feeding the catalyst in any manner such that the catalyst droplets do not immediately contact a substantial portion of the resin particles of the fluidized bed. The droplets of the unsupported catalyst in liquid form are introduced without immediately contacting growing polymer particles of the bed so as to provide an average polymer particle size (APS) ranging from about 0.01 to about 0.06 inches. Generally, the particle density in the particle lean zone is at least 10 times lower than that in the fluidized bed. As disclosed in U.S. Pat. No. 5,317,036, a liquid, unsupported catalyst is typically dispersed in a solvent such as isopentane and introduced into the fluidized bed using an inert carrier gas such as nitrogen. In the time period elapsing when the liquid catalyst in droplet form leaves the nozzle and contacts the particles in the bed, new polymer particles are formed. In the present invention, the time between the droplet leaving the nozzle and its contacting the particles in the bed ranges from about 0.01 seconds to 60 seconds, preferably about 0.01 to 30 seconds, and, most preferably, is about 0.01 seconds to 5 seconds. A particle lean zone may be a section of the reactor which normally does not contain the fluidized bed, such as the disengaging section, the gas recirculation system, or the area below the distributor plate. The particle lean zone may also be created by deflecting resin away from the catalyst spray with a stream of gas.

In a preferred embodiment of the present invention, the liquid catalyst system in a carrier gas (e.g., nitrogen, argon, alkane, or mixtures thereof) is surrounded by at least one gas which serves to move or deflect resin particles of the bed out of the path of the liquid catalyst system as it enters the fluidization zone and away from the area of catalyst system entry, thereby providing a particle lean zone. In a particularly preferred embodiment, the liquid catalyst system in the carrier gas is surrounded by at least two gases, the first gas serving primarily to deflect resin particles of the bed out of the path of the liquid catalyst and the second gas primarily prevents the injection tube or nozzle tip from getting clogged. The first or particle-deflecting gas and the second or tip-cleaning gas can each be selected from the group consisting of recycle gas, monomer gas, chain transfer gas (e.g., hydrogen), inert gas or mixtures thereof. Preferably the particle-deflecting gas is all or a portion of the recycle gas and the tip-cleaning gas is all or a portion of a monomer (e.g., ethylene or propylene) employed in the process.

Liquid catalyst in a carrier gas, particle-deflecting gas, and, when employed, the tip-cleaning gas can be introduced into the reactor at the same velocities to establish a particle lean zone. However, it is preferred that they enter the fluidization zone at differing velocities. Preferably, the liquid catalyst system in the carrier gas is introduced at a velocity ranging from about 50 ft/sec to about 400 ft/sec (15–122 m/s); the particle-deflecting gas is introduced at a velocity ranging from about 10 ft/sec to about 150 ft/sec (3–46 m/s), and, when employed, the tip-cleaning gas ranges in velocity from about 50 ft/sec to about 250 ft/sec (15–76 m/s). Preferably, the pressure of the particle-deflecting gas, and, when employed, the tip-cleaning gas is about 10 to about 50 psig (0.07–0.35 MPa), preferably about 20 to about 30 psig (0.14–0.21 MPa), than the pressure of the gas in the fluidization zone of the reactor. Typically, the particle-deflecting gas pressure ranges from about 10 to about 50 psig (0.07–0.35 MPa); the tip-cleaning gas pressure, when employed, ranges from about 50 to 250 psig (0.35–1.7 MPa); and the liquid catalyst/carrier gas pressure ranges from about 50 to about 250 psig (0.35–1.7 MPa). When the particle-deflecting gas is the recycle gas, it is a portion comprising about 5 to about 25 percent of the total recycle flow and is preferably removed from the discharge side of the compressor. When the tip-cleaning gas is the monomer gas, it is a portion comprising about 2 to about 40 percent of the total monomer flow. The particle-deflecting gas and the tip-cleaning gas can also optionally contain one or more antifoulants or antistatic agents known to those skilled in the art. While inert gases can be employed in the present invention as the particle-deflecting and tip-cleaning gases, they can be impractical because they require increased reactor venting, thereby decreasing efficiency of monomer usage and increasing cost.

Any catalyst delivery system that is capable of atomizing the catalyst system into droplets of the desired size and distribution and avoids plugging of the tip or nozzle can be employed in the present invention. One embodiment of a catalyst delivery system comprises a particle-deflecting gas tube enclosing an optional tip-cleaning gas tube which in turn encloses a catalyst injection tube. The particle-deflecting gas tube has a sufficient inside diameter for the insertion or mounting of the tip-cleaning gas tube. For a commercial fluidized bed reactor, typically the particle-deflecting gas tube has an inside diameter ranging from about 2 inches to about 12 inches (5 to 31 cm), preferably about 4 to about 6 inches (10–15 cm). The optional tip-cleaning gas tube, has an outside diameter capable of fitting inside the particle-deflecting gas tube. For a conventional reactor, typically the tip-cleaning gas tube has an inside diameter ranging from about 0.5 inches to about 1.5 inches (1.3–3.8 cm), preferably about 0.75 to about 1.25 inches (1.9–3.2 cm).

The particle-deflecting gas tube can be flush with the inside wall of the reactor or lead edge (top surface) of the distributor plate, or, preferably, it can be extended beyond the inside wall of the reactor or lead edge of the distributor plate into the fluidization zone. Preferably the particle-deflecting gas tube is flush with the inside wall or top of the distributor plate. When employed the tip-cleaning gas tube can be positioned flush with, extended beyond, or recessed in the particle-deflecting gas tube. Preferably the tip-cleaning gas tube is flush with or recessed in the particle-deflecting gas tube. Most preferably the tip-cleaning gas tube is flush with the particle-deflecting gas tube.

The catalyst injection tube or nozzle can be housed within the particle-deflecting gas tube, but is preferably housed within the tip-cleaning gas tube which is inside the particle-deflecting gas tube. Preferably the catalyst injection tube or nozzle is tapered at its tip to a fine or knife edge to minimize surface area for injector fouling and convenient entry to the reactor vessel. The catalyst injection tube or nozzle is secured or anchored to the inner wall of the particle-deflecting gas tube or preferably to the tip-cleaning gas tube by means of one or more fins or flanges. Stainless steel injection tubing and pneumatic spray nozzles are commercially available in a wide range of internal diameters and thicknesses such that tubing or nozzle size can easily be matched the amount of catalyst solution feed. For a commercial-size fluidized bed reactor, tubing and nozzles having about a ⅛-inch (0.3 cm) inside diameter can be employed. The orifice diameter in the spray nozzle tip is in the ranged of from about 0.01 inch to about 0.25 inch (0.03–0.64 cm), preferably from about 0.02 inch to about 0.15 inch (0.05–0.38 cm). The orifice diameter of the tip of the injection tube is between about 0.05 inch to about 0.25 inches (0.13–0.64 cm), preferably between about 0.1 inch to about 0.2 inches (0.25–0.51 cm). Suitable nozzles can be obtained from Spraying Systems Corporation (Wheation, Ill.) and can include the ⅛ JJ Series having standard and customized configurations. For a given liquid catalyst and reactor polymerization conditions the catalyst liquid feed rates can be adjusted by one skilled in the art to obtain the desired droplet size and distribution. The catalyst injection tube or nozzle can be located flush, extended, or recessed with respect to the leading tip edge of the particle-deflecting gas tube and/or optional tip-cleaning gas tube.

In the absence of the tip-cleaning gas tube, the catalyst injection tube or nozzle can be located flush, extended, or recessed with respect to the leading tip edge of the particle-deflecting gas tube. Preferably the catalyst injection tube or nozzle is located flush or extended with respect to the leading tip edge of the particle-deflecting gas tube in the absence of the tip-cleaning gas tube. Most preferably it is located flush in the particle-deflecting gas tube. When a tip-cleaning gas tube is employed in conjunction with the particle-deflecting gas tube, the catalyst injection tube or nozzle is extended beyond the leading edge of the tip-cleaning gas tube or flush with the leading edge to the tip-cleaning gas tube. Preferably, the catalyst injection tube or nozzle is extended 2 to 4 inches (5–10 cm) beyond the leading edge of the tip-cleaning gas tube, but recessed with respect to the particle-deflecting gas tube.

In another embodiment, the plenum may have more than one nozzle. In some embodiments where the pleunum contains more than one nozzle (such as two or three nozzles) the nozzles are fed from the same formation assembly. In other embodiments where the pleunum contains more than one nozzle (such as two or three nozzles) the nozzles are fed from the different formation assemblies. In some instances the additional nozzle can be used as a backup in case of malfunction or in other cases the additional nozzles can be used concurrently with the first nozzle.

Any type of polymerization catalyst may be used in the present process, provided it is stable and sprayable or atomizable when in liquid form. A single liquid catalyst may be used, or a liquid mixture of catalysts may be employed if desired. These catalysts are used with cocatalysts and promoters well known in the art. Examples of suitable catalysts include:

A. Ziegler-Natta catalysts, including titanium based catalysts such as those described in U.S. Pat. Nos. 4,376,062 and 4,379,758. Ziegler-Natta catalysts are well known in the art, and typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Bulky Ligand Metallocene catalysts as described below.

E. Cationic forms of metal halides, such as aluminum trihalides.

F. Cobalt catalysts and mixtures thereof such as those described in U.S. Pat. Nos. 4,472,559 and 4,182,814.

G. Nickel catalysts and mixtures thereof such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. Neodymium compounds, particularly neodymium neodecanoate, octanoate, and versatate, are the most preferred rare earth metal catalysts. Rare earth catalysts are used to produce polymers polymerized using butadiene or isoprene.

I. Other Specific Catalysts

In the process of this invention useful catalyst compounds include the traditional bulky ligand metallocene catalyst compounds include half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. In one preferred embodiment, at least one bulky ligands is η-bonded to the metal atom, most preferably η⁵-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system(s) are composed of carbon atoms such as but not limited to those cyclopentadienyl ligands or cyclopentadienyl ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds of the invention are represented by the formula:

$$L^A L^B M Q_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl ligands, heteroatom substituted and/or heteroatom containing cyclopentadienyl ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125 and WO 00/05236), aminomethylphosphine ligands (U.S. Pat. No. 6,034,240 and WO 99/46271), pyrrolyl ligands, pyrozolyl ligands, carbazolyl ligands, borabenzene ligands, B-diketiminate ligands (U.S. Pat. No. 6,034,258), fullerenes (U.S. Pat. No. 6,002,035) and the like, including hydrogenated versions thereof, for example tetrahydroindenyl ligands. In one embodiment, $L^A$ and $L^B$ may be any other ligand structure capable of η-bonding to M, preferably η³-bonding to M and most preferably η⁵-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like. In one embodiment, the bulky ligand metallocene catalyst compounds of the invention include those of formula (I) where $L^A$ and $L^B$ are bridged to each other by at least one bridging group, A, such that the formula is represented by $$L^A A L^B M Q_n \qquad (II)$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, sulfur, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$ $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (II) have two or more bridging groups A (EP 664 301 B1) or the bridge is heteroatomic (U.S. Pat. No. 5,986,025).

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503, 5,962,718, 5,965,078, 5,965,756, 5,965,757, 5,977,270, 5,977,392, 5,986,024, 5,986,025, 5,986,029, 5,990,033 and 5,990,331 and PCT publications WO 93/08221, WO 93/08199, WO 95/07140, WO 98/11144, WO 98/41530, WO 98/41529, WO 98/46650, WO 99/02540, WO 99/14221 and WO 98/50392 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein filly incorporated by reference. In this embodiment, the bulky ligand metallocene catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene catalyst compound is represented by the formula:

$$L^D M Q_2 (YZ) X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2(YZ)$ forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —$CR_2$— and —S—; Y is either C or S; Z is selected from the group consisting of —OR, —$NR_2$,—$CR_3$,—SR, —$SiR_3$,—$PR_2$,—H, and substituted or unsubstituted aryl groups, with the proviso that when Q is —NR— then Z is selected from one of the group consisting of —OR, —$NR_2$,—SR, —$SiR_3$,—$PR_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the metallocene catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these metallocene catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, new metallocene catalyst compounds are those complexes known as transition metal catalysts based on bidentate ligands containing pyridine or quinoline moieties, such as those described in U.S. application Ser. No. 09/103,620 filed Jun. 23, 1998, U.S. Pat. No. 6,103,657 filed Aug. 15, 2000 which is herein incorporated by reference. In another embodiment, the bulky ligand metallocene catalyst compounds are those described in PCT publications WO 99/01481 and WO 98/42664, which are fully incorporated herein by reference.

In one embodiment, these new metallocene catalyst compound is represented by the formula:

$$((Z)XA_t(YJ))_qMQ_n \quad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X,Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

It is within the scope of this invention, in one embodiment, that the miscellaneous catalyst compounds include complexes of $Ni^{2+}$ and $Pd^{2+}$ described in the articles Johnson, et al., "New Pd(II)- and Ni(II)- Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below. Other useful catalysts include those nickel complexes described in WO 99/50313, which is incorporated herein by reference.

Also included as useful catalysts are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference. Useful Group 6 bulky ligand metallocene catalyst systems are described in U.S. Pat. No. 5,942,462, which is incorporated herein by reference.

Other useful catalysts are those Group 5 and 6 metal imido complexes described in EP-A2-0 816 384 and U.S. Pat. No. 5,851,945, which is incorporated herein by reference. In addition, metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other useful catalysts are described as bis(hydroxy aromatic nitrogen ligands) in U.S. Pat. No. 5,852,146, which is incorporated herein by reference. Other useful catalysts containing one or more Group 15 atoms include those described in WO 98/46651, which is herein incorporated herein by reference. Still other useful catalysts include those multinuclear metallocene catalysts as described in WO 99/20665 and U.S. Pat. No. 6,010,794, and transition metal metaaracyle structures described in EP 0 969 101 A2, which are herein incorporated herein by reference. Other useful catalysts include those described in EP 0 950 667 A1, double cross-linked metallocene catalysts (EP 0 970 074 A1), tethered metallocenes (EP 970 963 A2) and those sulfonyl catalysts described in U.S. Pat. No. 6,008,394, which are incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Useful catalyst compounds also include compounds represented by the formula:

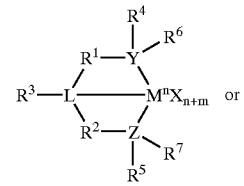

Formula A

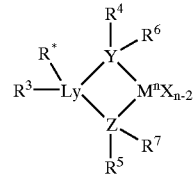

Formula B wherein

M is a group 3–12 transition metal or a group 13 or 14 main group metal, preferably a group 4, 5, or 6 metal, preferably zirconium or hafnium, each X is independently an anionic leaving group, preferably hydrogen, a hydrocarbyl group, a heteroatom or a halogen, y is 0 or 1, n is the oxidation state of M, preferably +3, +4, or +5, preferably +4, m is the formal charge of the YZL ligand, preferably 0, −1, −2 or −3, preferably −2, L is a group 15 or 16 element, preferably nitrogen, Y is a group 15 element, preferably nitrogen or phosphorus, Z is a group 15 element, preferably nitrogen or phosphorus, $R^1$ and $R^2$ are independently a $C_1$ to $C_{20}$ hydrocarbon group, a heteroatom containing group having up to twenty carbon atoms, silicon, germanium, tin, lead, phosphorus, a halogen, preferably a $C_2$ to $C_6$ hydrocarbon group, preferably a $C_2$ to $C_{20}$ alkyl, aryl or aralkyl group, preferably a linear, branched or cyclic $C_2$ to $C_{20}$ alkyl group, $R^1$ and $R^2$ may also be interconnected to each other, $R^3$ is absent or a hydrocarbon group, hydrogen, a halogen, a heteroatom containing group, preferably a linear, cyclic or branched alkyl group having 1 to 20 carbon atoms, more preferably $R^3$ is absent or hydrogen, $R^4$ and $R^5$ are independently an aryl group, a substituted aryl group, a cyclic alkyl group, a substituted cyclic alkyl group, a cyclic aralkyl group, a substituted cyclic aralkyl group or multiple ring system, preferably having up to 20 carbon atoms, preferably between 3 and 10 carbon atoms, preferably a $C_1$ to $C_{20}$ hydrocarbon group, a $C_1$ to $C_{20}$ aryl group or a $C_1$ to $C_{20}$ aralkyl group, $R^6$ and $R^7$ are independently absent, or hydrogen, halogen, heteroatom or a hydrocarbyl group, preferably a linear, cyclic or branched alkyl group having 1 to 20 carbon atoms, more preferably absent, and $R^*$ is absent, or is hydrogen, a group 14 atom containing group, a halogen, a heteroatom containing group, provided that when L is a group 14 atom then $R^3$ and $R^*$ may not be absent.

An aralkyl group is defined to be a substituted aryl group.

In a preferred embodiment, L is bound to one of Y or Z and one of $R^1$ or $R^2$ is bound to L and not to Y or Z.

In an alternate embodiment $R^3$ and L do not form a heterocyclic ring.

In a preferred embodiment $R^4$ and $R^5$ are independently a group represented by the following formula:

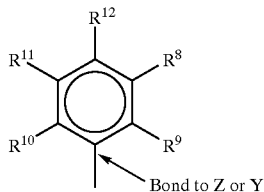

wherein $R^8$ to $R^{12}$ are each independently hydrogen, a $C_1$ to $C_{40}$ alkyl group, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group, in a preferred embodiment $R^9$, $R^{10}$ and $R^{12}$ are methyl groups, and $R^8$ and $R^{11}$ are hydrogen.

In a particularly preferred embodiment $R^4$ and $R^5$ are both a group represented by the following formula:

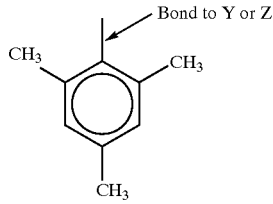

In this embodiment, M is preferably zirconium or hafnium, most preferably zirconium; each of L, Y, and Z is nitrogen; each of $R^1$ and $R^2$ is —$CH_2$—$CH_2$—; $R^3$ is hydrogen; and $R^6$ and $R^7$ are absent.

Another group of metal catalyst compounds that may be used in the process of this invention include one or more catalysts represented by the following formulae:

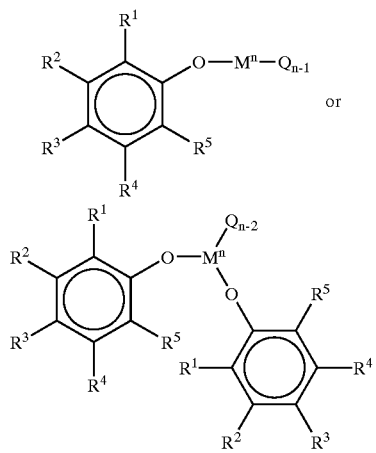

wherein $R^1$ is hydrogen or a $C_4$ to $C_{100}$ group, preferably a tertiary alkyl group, preferably a $C_4$ to $C_{20}$ alkyl group, preferably a $C_4$ to $C_{20}$ tertiary alkyl group, preferably a neutral $C_4$ to $C_{100}$ group and may or may not also be bound to M, and at least one of $R^2$ to $R^5$ is a group containing a heteroatom, the rest of $R^2$ to $R^5$ are independently hydrogen or a $C_1$ to $C_{100}$ group, preferably a $C_4$ to $C_{20}$ alkyl group (preferably butyl, isobutyl, pentyl hexyl, heptyl, isohexyl, octyl, isooctyl, decyl, nonyl, dodecyl) and any of $R^2$ to $R^5$ also may or may not be bound to M, O is oxygen, M is a group 3 to group 10 transition metal or lanthanide metal, preferably a group 4 metal, preferably Ti, Zr or Hf, n is the valence state of the metal M, preferably 2, 3, 4, or 5, Q is an alkyl, halogen, benzyl, amide, carboxylate, carbamate, thiolate, hydride or alkoxide group, or a bond to an R group containing a heteroatom which may be any of $R^1$ to $R^5$ A heteroatom containing group may be any heteroatom or a heteroatom bound to carbon silica or another heteroatom. Preferred heteroatoms include boron, aluminum, silicon, nitrogen, phosphorus, arsenic, tin, lead, antimony, oxygen, selenium, and tellurium. Particularly preferred heteroatoms include nitrogen, oxygen, phosphorus, and sulfur. Even more particularly preferred heteroatoms include oxygen and nitrogen. The heteroatom itself may be directly bound to the phenoxide ring or it may be bound to another atom or atoms that are bound to the phenoxide ring. The hetero atom containing group may contain one or more of the same or different heteroatoms. Preferred heteroatom groups include imines, amines, oxides, phosphines, ethers, ketenes, oxoazolines heterocyclics, oxazolines, thioethers, and the like. Particularly preferred heteroatom groups include imines. Any two adjacent R groups may form a ring structure, preferably a 5 or 6 membered ring. Likewise the R groups may form multi-ring structures. In one embodiment any two or more R groups do not form a 5 membered ring.

In a preferred embodiment, Q is a bond to any of $R^2$ to $R^5$ and the R group that Q is bound to is a heteroatom containing group.

These phenoxide catalysts may be activated with activators including alkyl aluminum compounds (such as diethylaluminum chloride), alumoxanes, modified alumoxanes, non-coordinating anions, non-coordinating group 13 metal or metalliod anions, boranes, borates and the like.

Activator and Activation Methods for the Metallocene Catalyst Compounds

The above described catalyst compounds are typically activated in various ways to yield catalyst systems having a vacant coordination site that will coordinate, insert, and polymerize olefin(s).

For the purposes of this patent specification and appended claims, the term "activator" is defined to be any compound or component or method which can activate any of the catalyst compounds of the invention as described above. Non-limiting activators, for example may include a Lewis acid or a non-coordinating ionic activator or ionizing activator or any other compound including Lewis bases, aluminum alkyls, conventional cocatalysts and combinations thereof that can convert a neutral metallocene catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof, that would ionize the neutral metallocene catalyst compound.

In one embodiment, an activation method using ionizing ionic compounds not containing an active proton but capable of producing both a catalyst cation and a non-coordinating anion are also contemplated, and are described in EP-A-0 426 637, EP-A-0 573 403 and U.S. Pat. No. 5,387,568, which are all herein incorporated by reference. An aluminum based ionizing activator is described in U.S. Pat. No. 5,602, 269 and boron and aluminum based ionizing activators are described in WO 99/06414, which are incorporated herein by reference, and are useful in this invention.

There are a variety of methods for preparing alumoxane and modified alumoxanes, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publications WO 94/10180 and WO 99/15534, all of which are herein fully incorporated by reference. A preferred alumoxane is a modified methyl alumoxane (MMAO) cocatalyst type 3A (commercially available from Akzo Chemicals, Inc. under the trade name Modified Methylalumoxane type 3A.

Organoaluminum compounds as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, abandoned May 23, 1995 all of which are herein fully incorporated by reference.

Other activators include those described in PCT publication WO 98/07515 such as tris (2, 2', 2" -nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating metallocene catalyst compounds with perchlorates, periodates and iodates including their hydrates. WO 98/30602 and WO 98/30603 incorporated by reference describe the use of lithium (2,2'-bisphenyl-ditrimethylsilicate)•4THF as an activator for a metallocene catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in for example, U.S. Pat. Nos. 5,849,852, 5,859,653 and 5,869,723 and WO 98/32775, WO 99/42467 (dioctadecylmethyl-ammonium-bis(tris(pentafluorophenyl)borane)benzimidazolide), which are herein incorporated by reference.

It is also within the scope of this invention that the above described catalyst compounds can be combined with one or more of the catalyst compounds described above with one or more activators or activation methods described above.

It is further contemplated by the invention that other catalysts can be combined with the above catalyst compounds. For example, see U.S. Pat. Nos. 4,937,299, 4,935, 474, 5,281,679, 5,359,015, 5,470,811, and 5,719,241 all of which are herein fully incorporated herein reference. It is also contemplated that any one of the metallocene catalyst compounds of the invention have at least one fluoride or fluorine containing leaving group as described in U.S. application Ser. No. 09/191,916 filed Nov. 13, 1998 pending.

In another embodiment of the invention one or more metallocene catalyst compounds or catalyst systems may be used in combination with one or more conventional catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Supports, Carriers and General Supporting Techniques

The above described catalyst compounds, activators and/ or catalyst systems may be combined with one or more support materials or carriers.

For example, in a most preferred embodiment, the activator is contacted with a support to form a supported activator wherein the activator is deposited on, contacted with, vaporized with, bonded to, or incorporated within, adsorbed or absorbed in, or on, a support or carrier.

Support materials of the invention include inorganic or organic support materials, preferably a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The preferred support materials are inorganic oxides that include those Group 2, 3, 4, 5, 13 or 14 metal oxides. The preferred supports include silica, fumed silica, alumina (WO 99/60033), silica-alumina and mixtures thereof. Other useful supports include magnesia, titania, zirconia, magnesium chloride (U.S. Pat. No. 5,965,477), montmorillonite (EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is fumed silica available under the trade name Cabosil™ TS-610, available from Cabot Corporation. Fumed silica is typically a silica with particles 7 to 30 nanometers in size that has been treated with dimethylsilyl-dichloride such that a majority of hydroxyl groups are capped.

It is preferred that the support material, most preferably an inorganic oxide, has a surface area in the range of from about 10 to about 700 m$^2$/g, pore volume in the range of from about 0.1 to about 4.0 cc/g and average particle size in the range of from about 5 to about 500 $\mu$m. More preferably, the surface area of the support is in the range of from about 50 to about 500 m$^2$/g, pore volume of from about 0.5 to about 3.5 cc/g and average particle size of from about 10 to about 200 $\mu$m. Most preferably the surface area of the support is in the range from about 100 to about 1000 m$^2$/g, pore volume from about 0.8 to about 5.0 cc/g and average particle size is from about 5 to about 100 $\mu$m. The average pore size of the support material of the invention typically has pore size in the range of from 10 to 1000 Å, preferably 50 to about 500 Å, and most preferably 75 to about 450 Å.

There are various methods known in the art for producing a supported activator or combining an activator with a support material. In an embodiment, the support material is chemically treated and/or dehydrated prior to combining with the catalyst compound, activator and/or catalyst system.

In one embodiment, an alumoxane is contacted with a support material, preferably a porous support material, more preferably a inorganic oxide, and most preferably the support material is silica.

In an embodiment, the support material having a various levels of dehydration, preferably 200° C. to 600° C. dehydrated silica, that is then contacted with an organoaluminum or alumoxane compound. In specifically the embodiment wherein an organoaluminum compound is used, the activator is formed in situ the support material as a result of the reaction of for example trimethylaluminum and water.

In yet another embodiment, a Lewis base-containing support substrates will react with a Lewis acidic activator to form a support bonded Lewis acid compound. The Lewis base hydroxyl groups of silica are exemplary of metal/metalloid oxides where this method of bonding to a support occurs. This embodiment is described in U.S. patent application Ser. No. 09/191,922, filed Nov. 13, 1998, U.S. Pat. No. 6,147,173 filed Nov. 14, 2000 which is herein incorporated by reference.

Other embodiments of supporting an activator are described in U.S. Pat. No. 5,427,991, where supported non-coordinating anions derived from trisperfluorophenyl boron are described; U.S. Pat. No. 5,643,847 discusses the reaction of Group 13 Lewis acid compounds with metal oxides such as silica and illustrates the reaction of trisperfluorophenyl boron with silanol groups (the hydroxyl groups of silicon) resulting in bound anions capable of protonating transition metal organometallic catalyst compounds to form catalytically active cations counter-balanced by the bound anions; immobilized Group IIIA Lewis acid catalysts suitable for carbocationic polymerizations are described in U.S. Pat. No. 5,288,677; and James C. W. Chien, Jour. Poly. Sci.: Pt A: Poly. Chem, Vol. 29, 1603–1607 (1991), describes the olefin polymerization utility of methylalumoxane (MAO) reacted with silica ($SiO_2$) and metallocenes and describes a covalent bonding of the aluminum atom to the silica through an oxygen atom in the surface hydroxyl groups of the silica.

In the preferred embodiment, the supported activator is formed by preparing in an agitated, and temperature and pressure controlled vessel a solution of the activator and a suitable solvent, then adding the support material at temperatures from 0° C. to 100° C., contacting the support with the activator solution for up to 24 hours, then using a combination of heat and pressure to remove the solvent to produce a free flowing powder. Temperatures can range from 40 to 120° C. and pressures from 5 psia to 20 psia (34.5 to 138 kPa). An inert gas sweep can also be used in assist in removing solvent. Alternate orders of addition, such as slurrying the support material in an appropriate solvent then adding the activator, can be used.

In an embodiment, the weight percent of the activator to the support material is in the range of from about 10 weight percent to about 70 weight percent, preferably in the range of from 20 weight percent to about 60 weight percent, more preferably in the range of from about 30 weight percent to about 50 weight percent, and most preferably in the range of from 30 weight percent to about 40 weight percent.

By conventional supported catalysts system it is meant those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. Nos. 08/271,598 filed Jul. 7, 1994 now U.S. Pat. No 546,872 filed Nov. 21, 1995 and 08/788,736 filed Jan. 23, 1997 now U.S. Pat. No. 6,090,740 filed Jul. 18, 2000 and PCT publications WO 95/32995, WO 95/14044, WO 96/06187 and WO 97/02297, and EP-B1-0 685 494.

The catalyst components, for example catalyst compound, activator and support, may generally be fed into the polymerization reactor as a mineral oil slurry. Solids concentrations in oil are about 10–15 weight %, preferably 11–14 weight %.

The catalyst compounds, activators and or optional supports used herein may also be spray dried separately or together prior to being injected into the reactor. The spray dried catalyst may be used as a powder, or solid or may be placed in a diluent and slurried into the reactor.

In another embodiment the catalyst compounds and activators used herein are not supported.

Polymerization Process

The catalyst systems prepared above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

In one embodiment, the process of this invention is directed toward a gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1,4-methyl-pentene-1,3-methyl-pentene-1, hexene-1, octene-1,3,5,5-tri-methyl-hexene-1, and decene-1. Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene. Preferred co-monomers include those dienes disclosed in U.S. Pat. No. 5,317,036 to Brady et al. such as hexadiene, dicyclopentadiene, norbornadiene, and ethylidene norbornene; and readily condensable monomers such as those disclosed in U.S. Pat. No. 5,453,471 including isoprene, styrene, butadiene, isobutylene, and chloroprene, acrylonitrile, and the like.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 600 psig (4137 kPa), preferably in the range of from about 200 psig (1379 kPa) to about 500 psig (3448 kPa), more preferably in the range of from about 250 psig (1724 kPa) to about 400 psig (2759 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 105° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

In a preferred embodiment this invention is practiced while the gas phase reactor is operated in condensed mode. Condensed mode polymerizations are disclosed in U.S. Pat. Nos. 4,543,399; 4,588,790; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition condensable fluids of the polymerization process itself other condensable fluids, inert to the polymerization can be introduce to "induce" condensing mode operation. Examples of suitable condensable fluids may be selected from liquid saturated hydrocarbons containing 2 to 8 carbon atoms (e.g., propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Condensable fluids may also include polymerizable condensable comonomers such as olefins, alpha-olefins, diolefins, diolefins containing at least one alpha olefin, and mixtures thereof. In condensing mode, it desirable that the liquid entering the fluidized bed be dispersed and vaporized quickly.

The process of the invention can optionally employ inert particulate materials as fluidization aids. These inert particulate materials can include carbon black, silica, talc, and clays, as well as inert polymeric materials. Carbon black has a primary particle size of about 10 to about 100 nanometers, an average size of aggregate of about 0.1 to about 10 microns, and a specific surface area of about 30 to about 1,500 m$^2$/gm. Silica has a primary particle size of about 5 to about 50 nanometers, an average size of aggregate of about 0.1 to about 10 microns, and a specific surface area of about 50 to 500 m$^2$/gm. Clay, talc, and polymeric materials have an average particle size of about 0.01 to about 10 microns and a specific surface area of about 3 to 30 m$^2$/gm. These inert particulate materials are employed in amounts ranging about 0.3 to about 80%, preferably about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives can be, and often are, employed in the polymerization process of the invention. Chain transfer agents are often used to control polymer molecular weight. Examples of these compounds are hydrogen and metal alkyls of the general formula M$^x$R$_y$, where M is a Group 3–12 metal, x is the oxidation state of the metal, typically 1, 2, 3, 4, 5 or 6, each R is independently an alkyl or aryl, and y is 0, 1, 2, 3, 4, 5, or 6. Preferably, a zinc alkyl is employed; and, of these, diethyl zinc is most preferred. Typical promoters include halogenated hydrocarbons such as CHCl$_3$, CFCl$_3$, CHI$_3$ CCl$_3$, CFl$_2$ ClCCl$_3$, and ethyltrichloroacetate. Such promoters are well known to those skilled in the art and are disclosed in, for example, U.S. Pat. No. 4,988,783. Other organometallic compounds such as scavenging agents for poisons may also be employed to increase catalyst activity. Examples of these compounds include metal alkyls, such as aluminum alkyls, most preferably triisobutylaluminum. Some compounds may be used to neutralize static in the fluidized-bed reactor, others known as drivers rather than antistatic agents, may consistently force the static to from positive to negative or from negative to positive. The use of these additives is well within the skill of those skilled in the art. These additives may be added to the reaction zone separately or independently from the liquid catalyst if they are solids, or as part of the catalyst provided they do not interfere with the desired atomization. To be part of the catalyst solution, the additives should be liquids or capable of being dissolved in the catalyst solution.

Preferred among these different catalyst systems are catalyst compositions comprising a metallocene catalyst compound in liquid form and an activator. The practice of this invention is not limited to any particular class or kind of metallocene catalyst. Accordingly, the catalyst composition may comprise any unsupported metallocene catalyst compound useful in slurry, solution, bulk, or gas phase olefin polymerization. One or more than one metallocene catalyst compounds may be employed. For example, as described in U.S. Pat. No. 4,530,914, at least two different catalysts compounds may be used in a catalyst system to achieve a broadened molecular weight distribution polymer product. Alternatively, all or a portion of the activator can be fed separately from the metal compound(s) to the reactor. Promoters associated with any particularly polymerization are usually added to the reactor separately from the activator and/or metal compound(s). If the metal compound and/or the activator occurs naturally in liquid form, it can be introduced "neat" into the particle lean zone. More likely, the liquid catalyst system is introduced into the particle lean zone as a solution (single phase, or "true solution" using a solvent to dissolve the metal compound and/or activator), an emulsion (partially dissolving the catalyst system components in a solvent), suspension, dispersion, or slurry (each having at least two phases). Preferably, the liquid catalyst system employed is a solution or an emulsion, most preferably a solution. As used herein, "liquid catalyst" or "liquid form" includes neat, solution, emulsion, and dispersions of the transition metal or rare earth metal component(s) of the catalyst and/or co-catalyst.

For purposes of this invention and the claims thereto, a catalyst system comprises at least one catalyst compound and at least one activator.

The solvents that which can be utilized to form solutions of the soluble, unsupported transition metal and/or rare earth metal polymerization catalyst compounds are inert solvents, preferably non-functional hydrocarbon solvents, and may include aliphatic hydrocarbons such as butane, isobutane, ethane, propane, pentane, isopentane, hexane, heptane, octane, decane, dodecane, hexadecane, octadecane, and the like; alicyclic hydrocarbons such as cyclopentane, methylcyclopentane, cyclohexane, cycloctane, norbornane, ethylcyclohexane and the like; aromatic hydrocarbons such as benzene, toluene, ethylbenzene, propylbenzene, butylbenzene, xylene, tetrahydrofuran and the like; and petroleum fractions such as gasoline, kerosene, light oils, and the like. Likewise, halogenated hydrocarbons such as methylene chloride, chlorobenzene, and the like may also be utilized. By "inert" is meant that the material being referred to is non-deactivating in the polymerization reaction zone under the conditions of gas phase polymerization and is non-deactivating with the catalyst in or out of the reaction zone. By "non-functional", it is meant that the solvents do not contain groups such as strong polar groups which can deactivate the active catalyst metal sites.

The concentration of the catalyst and/or activator that is in solution that is provided to the lean particle zone may be as high as the saturation point of the particular solvent being used. Preferably, the concentration is in the range of from about 0.01 to about 10,000 millimoles/liter. Of course, if the catalyst and/or co-catalyst is being used in its neat form, i.e., in its liquid state with no solvent, it will be comprised of essentially pure catalyst and/or activator, respectively.

The size of the droplets formed when introducing the catalyst system into the reactor is generally determined by the manner and place in which the catalyst is introduced. It is desirable to use a means of introduction which is able to provide liquid droplets in the particle lean zone having an average diameter which is in the range of from about 0.1 to about 1000 microns, preferably within a range of 0.1 to 500 microns, most preferably ranging from about 1 to 150 microns. A narrow distribution of droplet size in a lower or mid range of about 10 to about 100 can prevent the formation of large agglomerates resulting from large droplets and the formation of fines resulting from small droplets. Under many conditions, however, a wide droplet size distribution is acceptable as the smaller droplets can agglomerate to some degree with the resin in the reactor and large droplets can from larger particles of up to 0.25 cm which can be readily fluidized as long as the particle fraction is low enough, preferably less than 10% and more preferably less than 2% by weight of the total resin in the bed.

A preferred process of the invention is where the process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

In one embodiment of the invention, olefin(s), preferably $C_2$ to $C_{30}$ olefin(s) or alpha-olefin(s), preferably ethylene or propylene or combinations thereof are prepolymerized in the presence of the metallocene catalyst systems of the invention described above prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The polymerization catalyst in liquid form can be fed with a carboxylate metal salt and a flow improver, as a solid or a liquid, to a reactor using the injection methods described in PCT publication WO 97/46599, which is fully incorporated herein by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art, see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and coextrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

In order to provide a better understanding of the present invention including representative advantages thereof, the following examples are offered.

EXAMPLES

Density is measured according to ASTM D 1505.
Melt Index (MI) $I_2$ and $I_{21}$ are measured according to ASTM D-1238, Condition E, at 190° C.
Melt Index Ratio (MIR) is the ratio of $I_{21}$ over $I_2$ as determined by ASTM D-1238.
"PPH" is pounds per hour.

Example 1

A gas phase fluid bed polymerization reactor as depicted in FIG. 1 having a diameter of about 8 ft (2.4 m) and a bed height of about 38 feet (11.6 m) operates at a total pressure of 270 psig (18.6 MPa), an ethylene partial pressure of 200 psi (13.8 MPa), a temperature of 80° C., a $C_6/C_2$ mole ratio of 0.030 and a hydrogen concentration of 150 ppm. The cycle gas contains approximately 19.6 psi (1.4 MPa) isopentane partial pressure and the remainder is essentially nitrogen. The superficial gas velocity is about 2.0 ft/sec(61 cm/sec), the bed weight is about 30,000 lbs (13,608 kg) and approximately 10,000 pph(4536 kg/hr) of resin is being produced. Approximately 5 wt % of the cycle gas is condensed. The temperature of the inlet gas leaving the cooler and entering the bottom head is about 42° C. The temperature of the gas at the inlet of the cycle gas cooler is 82.4° C. The total weight of gas circulated by the cycle gas blower is 500,000. A 25,000 pph (11340 kg/hr) slipstream of the cycle gas is taken off prior to the cycle gas cooler and mixed with a 25000 pph(11340 kg/hr) slipstream of cycle gas taken off after the cycle gas cooler. The temperature of the mixed streams is 59° C. and by equilibrium calculation is all vapor. This total 50,000 pph (22676 kg/hr) flow rate of slipstream cycle gas is directed to the plenum. The plenum has an internal diameter of 6 inches (15.2 cm) and extends about 3 feet (91.4 cm) into the reactor fluid bed at a height of about 8 feet (2.4 m). A solution of mono-indenyl zirconium tri-carbamate metallocene catalyst as a 2 wt % solution in toluene is introduced with a 18 wt % solution of modified methyl aluminoxane type 3A in isopentane through a ³⁄₁₆ in (0.48 cm) OD stainless steel injection tube (nominal 0.035 inch (0.09 cm) wall thickness) that extends through a thick wall support tube having an internal diameter of about ¾ inch (1.9 cm) to about 1.0 inch (2.5 cm). Carrier flows of 20 pph (9.1 kg/hr) nitrogen and 10 pph(4.5 kg/hr) isopentane are added with the catalyst. The support tube extends about two inches beyond the end of the plenum into the bed and the ³⁄₁₆ inch (0.48 cm) injection tube extends about 1 inch (2.5 cm) beyond the support tube. A flow rate 2,500 pph (1134 kg/hr) of fresh ethylene at a temperature of about 90° C. is introduced to the fluid bed via the support tube as a tip cleaning gas for the catalyst injection tube. The 50,000 pph (22680 kg/hr) plenum gas flow acts a deflecting gas to create a particle-lean zone into which the catalyst is dispersed.

Even though the reactor is operating in condensing-mode, the cycle gas at the plenum flow is dry. Catalyst is dispersed into this dry, resin lean zone. The resulting resin average particle size is about 0.035 inch (0.09 cm) and the fraction of resin particles greater than 10 mesh screen is less than 10 wt %. The resin has a melt index (I2) of about 1 dg/min and a polymer density of about 0.918 g/cc.

All documents described herein are incorporated by reference herein, including any priority documents and/or testing procedures. As is apparent form the foregoing general description and the specific embodiments, while forms of the invention have been illustrated and described, various modifications can be made without departing from the spirit and scope of the invention. It is also contemplated that the invention may be practiced utilizing two or more gas phase reactors or a gas phase reactor in series with a slurry polymerization reactor. Accordingly it is not intended that the invention be limited thereby.

We claim:

1. A method to polymerize olefin(s) comprising contacting one or more monomer(s) with a catalyst system in a gas phase reactor having a recycle system for removing a recycle gas and unreacted monomer(s) from the reactor and returning the recycle gas and fresh monomer(s) to the reactor, and a plenum, the method comprising the steps of:
   (a) cooling a portion of the recycle gas to form a cooled recycle gas;
   (b) optionally combining the cooled recycle gas with additional recycle gas; and
   (c) injecting the cooled recycle gas into the gas phase reactor through the plenum as particle-deflecting gas to create a particle lean zone into which the catalyst system is dispersed.

2. The method of claim 1 wherein the plenum comprises an injection tube supported inside a support tube.

3. The method of claim 2 wherein monomer(s) is injected through the support tube.

4. The method of claim 2 wherein the recycle gas is injected through the injection tube.

5. The method of claim 2 wherein the recycle gas is injected through the support tube.

6. The method of claim 1 wherein the recycle gas has been cooled to within 20° C. above the dew point of the recycle gas.

7. The method of claim 1 wherein the recycle gas has been cooled to within 10° C. above the dew point of the recycle gas.

8. The method of claim 1 wherein the recycle gas has been cooled to within 5° C. above the dew point of the recycle gas.

9. The method of claim 1 wherein the cooled recycle gas is combined with additional recycle gas.

10. The method of claim 9 where the additional recycle gas is heated or cooled prior to being combined with the cooled recycle gas.

11. The method of claim 1 wherein monomer(s) is injected via the plenum.

12. The process of claim 2 wherein the injection tube has a diameter of about 1/16 inch to about 1/2 inch.

13. The method of claim 2 wherein the support tube has a diameter of about 1/4 inch to about 5 inches.

14. The method of claim 2 wherein the injection tube has a diameter of 1/4 inch to 3/8th inch and the support tube has a diameter about 3/4 to 2 inches.

15. The method of claim 1 wherein up to 50 wt. % of the recycle gas has been cooled prior to injection via the plenum.

16. The method of claim 1 wherein the recycle gas has been cooled to a temperature less than the dew point of the recycle gas.

17. The method of claim 1 wherein step (a) is cooling the recycle gas to form a cooled recycle gas.

18. The method of claim 14, wherein the monomer is injected through the support tube.

* * * * *